United States Patent
Gorodetskiy et al.

(10) Patent No.: US 8,243,051 B2
(45) Date of Patent: Aug. 14, 2012

(54) RING-SHAPED WIRELESS INPUT DEVICE WITH SCROLL FUNCTION

(75) Inventors: Denis Gorodetskiy, Suwon-si (KR); Kwang-Pyo Choi, Anyang-si (KR); Han-Sang Kim, Suwon-si (KR); Yun-Je Oh, Yongin-si (KR); Young-Hun Joo, Yongin-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 923 days.

(21) Appl. No.: 12/243,152

(22) Filed: Oct. 1, 2008

(65) Prior Publication Data
US 2009/0091556 A1    Apr. 9, 2009

(30) Foreign Application Priority Data
Oct. 4, 2007    (KR) .................. 10-2007-0099867

(51) Int. Cl.
*G09G 5/00* (2006.01)
*G06F 3/33* (2006.01)

(52) U.S. Cl. ........ 345/184; 345/204; 345/156; 345/179; 345/157; 345/158; 345/166; 345/167

(58) Field of Classification Search ............ 345/30, 345/156–184, 204, 684, 905; 455/566; 178/18.06; 235/375; 200/6 A, 5 A; 324/207.13, 207.17
See application file for complete search history.

(56) References Cited

U.S. PATENT DOCUMENTS

| | | | | | |
|---|---|---|---|---|---|
| 5,168,221 | A | * | 12/1992 | Houston | 324/207.13 |
| 5,559,432 | A | * | 9/1996 | Logue | 324/207.17 |
| 5,670,989 | A | * | 9/1997 | Owen | 345/163 |
| 6,148,094 | A | * | 11/2000 | Kinsella | 382/124 |
| 6,501,458 | B2 | * | 12/2002 | Baker et al. | 345/161 |
| 7,145,549 | B1 | * | 12/2006 | Sun | 345/157 |
| 7,898,523 | B1 | * | 3/2011 | Van Meter | 345/158 |
| 2002/0003527 | A1 | * | 1/2002 | Baker et al. | 345/156 |
| 2005/0041048 | A1 | * | 2/2005 | Hillman et al. | 345/905 |
| 2005/0231476 | A1 | * | 10/2005 | Armstrong | 345/161 |
| 2007/0024575 | A1 | * | 2/2007 | Makuth et al. | 345/156 |
| 2007/0268259 | A1 | * | 11/2007 | Griffin et al. | 345/169 |
| 2008/0079604 | A1 | * | 4/2008 | Madonna et al. | 340/825.72 |
| 2008/0284742 | A1 | * | 11/2008 | Prest et al. | 345/173 |
| 2009/0002316 | A1 | * | 1/2009 | Rofougaran | 345/156 |
| 2011/0007035 | A1 | * | 1/2011 | Shai | 345/179 |
| 2011/0095979 | A1 | * | 4/2011 | Sheng et al. | 345/158 |

* cited by examiner

*Primary Examiner* — Prabodh M Dharia
(74) *Attorney, Agent, or Firm* — Cha & Reiter, LLC

(57) ABSTRACT

A ring-shaped wireless input device for providing an indication of a scroll direction includes a housing having a ring shape, a wheel rotatably installed on the housing, a first sensor unit, that has first and second sections alternatively disposed along a circumference of the wheel and rotated along with the wheel, and a wireless communication unit which is fixedly disposed in the housing, and includes a second sensor unit arranged with the first sensor unit, the communication unit sending a scroll signal indicating an arranged state of the first sensor with regard to the second sensor to the host device.

17 Claims, 6 Drawing Sheets

RING-SHAPED WIRELESS INPUT DEVICE WITH SCROLL FUNCTION

CLAIM OF PRIORITY

This application claims the benefit of the earlier filing date, under 35 U.S.C. §119(a), to that patent application entitled "RING-SHAPED WIRELESS INPUT DEVICE WITH SCROLL FUNCTION" filed in the Korean Intellectual Property Office on Oct. 4, 2007 and assigned Serial No. 2007-99867, the contents of which are hereby incorporated by reference.

BACKGROUND OF THE INVENTION

1. Field of the Invention

The present invention relates to a wireless input device, and more particularly to a ring-shaped wireless input device with a scroll function that is put on the finger of a user and sends a scroll signal to a host device.

2. Description of the Related Art

Typical electronic equipment includes a host device corresponding to a main body, and an input device corresponding to a peripheral device. The input device may be integrated with the main body or may be separated from the main body. A user sends various pieces of information to the host device using the input device by wire or wirelessly.

In the case of a conventional input device that does not support a scroll function, the user must repeatedly push down on a button so often that the user may suffer pain in his finger. Further, the user must accurately check and push down the desired buttons a desired number of times. Thus, this creates difficulty in the use of the device.

Scroll functions are broadly used for radio terminals, household electric appliances, etc. in addition to mice for a computer. This scroll function can be used for scrolling, rotating, tuning, listing, etc. of a screen.

However, the conventional input device with the scroll function, such as a mouse, is usually provided as an auxiliary input device together with a main input device such as a keyboard. In this case, the user must frequently move his hand between the keyboard and the mouse, so that the user may suffer from carpal tunnel syndrome.

Thus, there is a need for an input device that provides convenient use, a simple configuration, and application to various electronic devices, and includes the scroll function.

SUMMARY OF THE INVENTION

The present invention provides a ring-shaped wireless input device having a scroll function capable of being put on the finger of a user, providing convenient use, a simple configuration, and application to various electronic devices.

In accordance with an aspect of the present invention, there is provided a ring-shaped wireless input device, which sends information input by a user to a host device wirelessly. The ring-shaped wireless input device comprises a housing having a ring shape, a wheel rotatably installed on the housing, a first sensor unit that has first and second sections alternatively disposed along a circumference of the wheel and is rotated along with the wheel, and a wireless communication unit, disposed in the housing, that has a second sensor unit arranged with the first sensor unit, and sends a scroll signal indicating an arranged state to the host device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
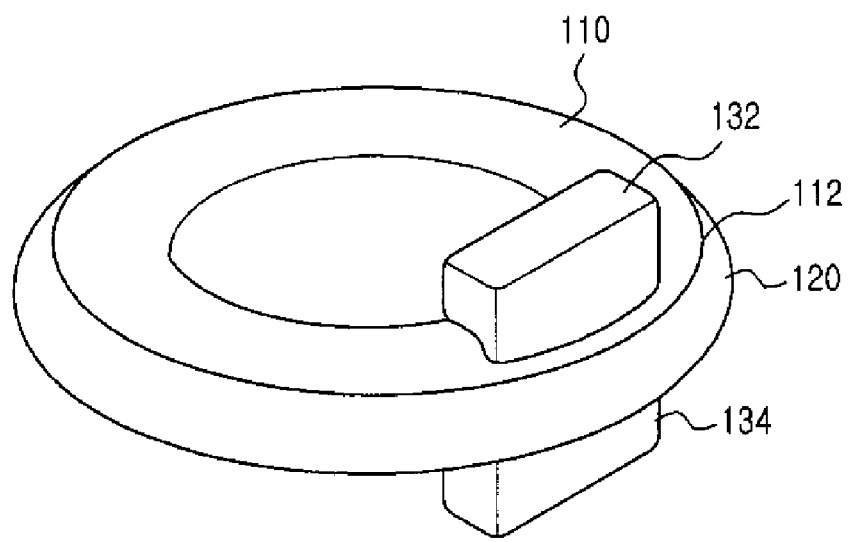
FIG. 1 is a perspective view illustrating a ring-shaped wireless input device according to an exemplary embodiment of the present invention.

Exemplary embodiments of the present invention are described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, for the purposes of clarity and simplicity, a detailed description of known functions and configurations incorporated herein will be omitted as it may make the subject matter of the present invention rather unclear.

Figure 2:
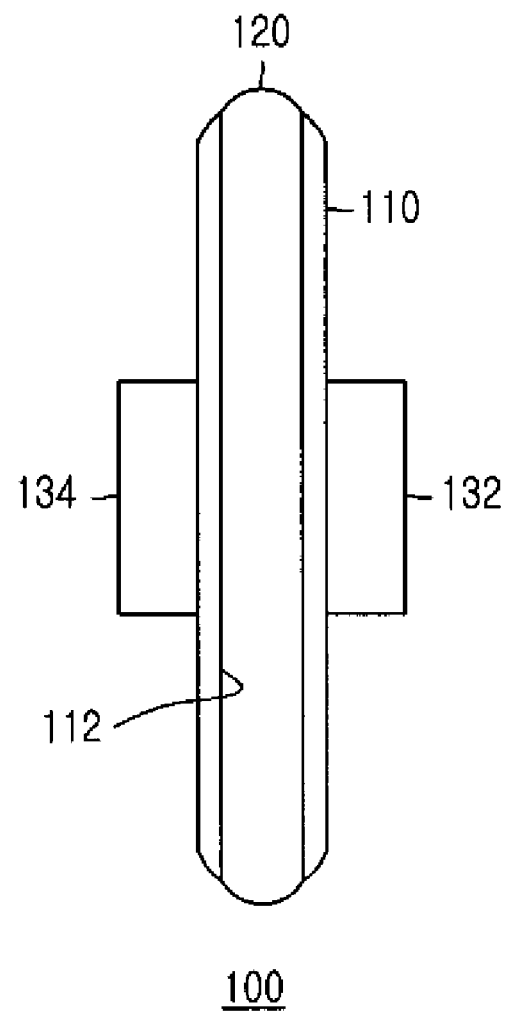
FIG. 2 is a side view illustrating the ring-shaped wireless input device of FIG. 1.
Figure 3:
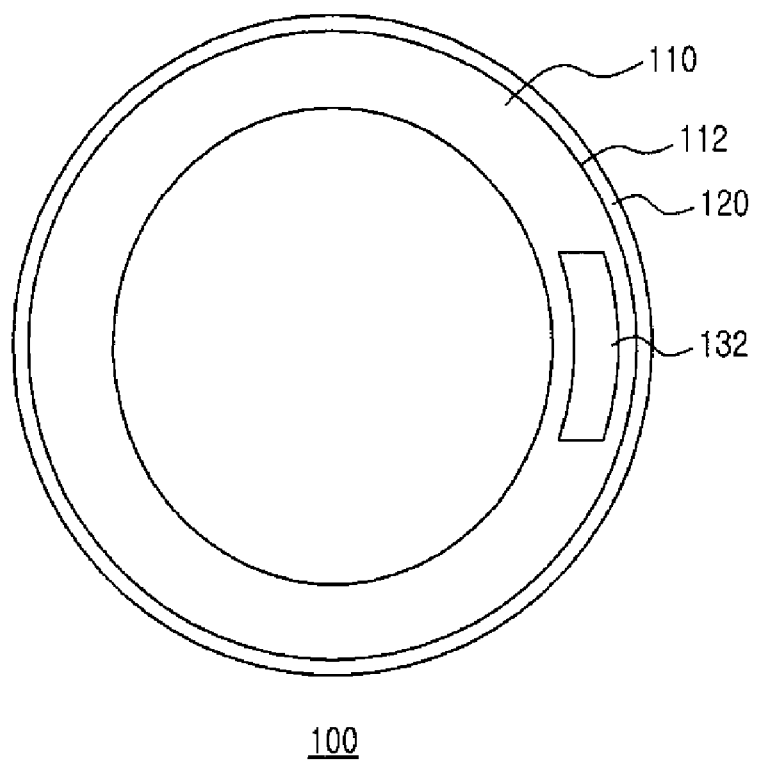
FIG. 3 is a front view illustrating the ring-shaped wireless input device of FIG. 1.

FIG. 1 is a perspective view illustrating a ring-shaped wireless input device according to an exemplary embodiment of the present invention. FIG. 2 is a side view illustrating the ring-shaped wireless input device of FIG. 1. FIG. 3 is a front view illustrating the ring-shaped wireless input device of FIG. 1.

Figure 4:
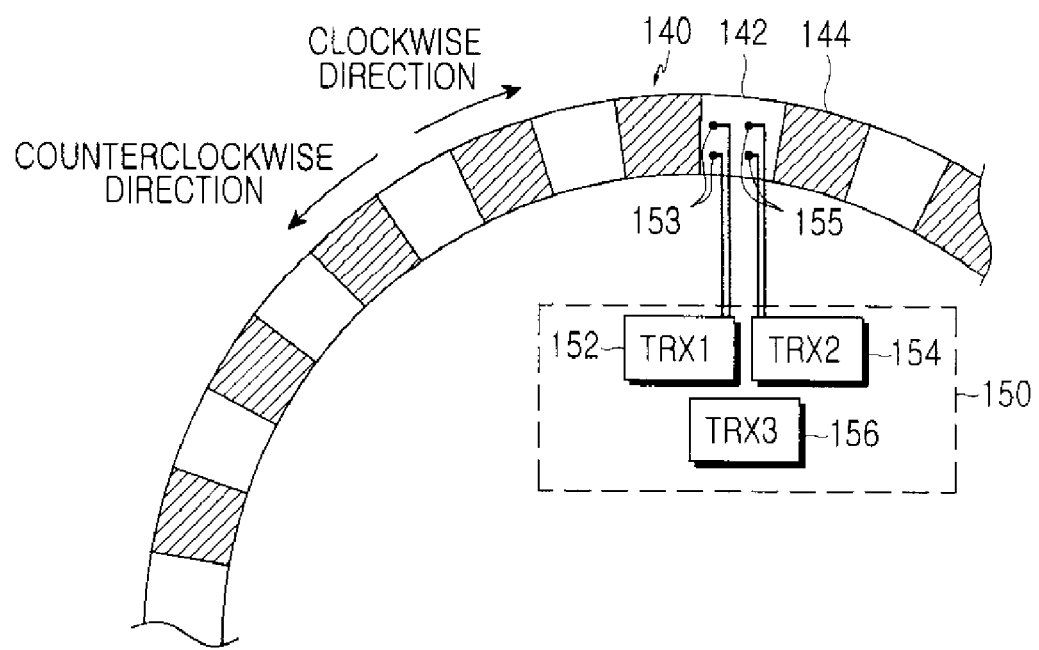
FIG. 4 illustrates a first sensor unit.
Figure 5:
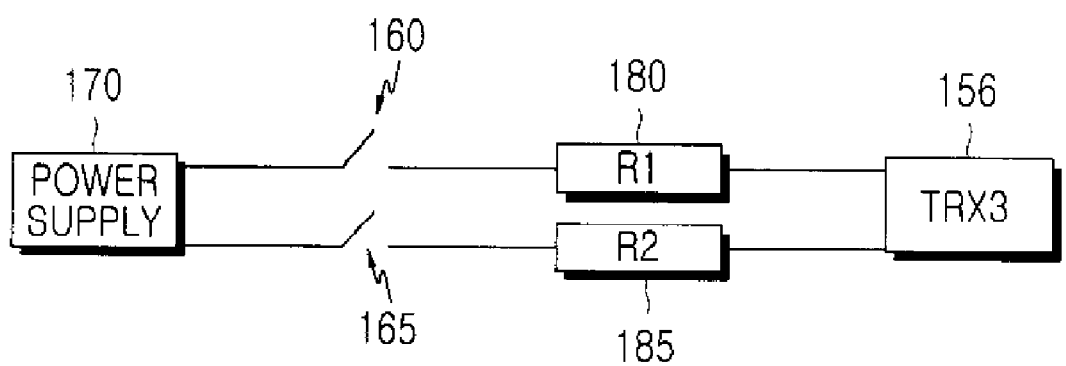
FIG. 5 illustrates a circuit associated with first and second buttons.

Referring to FIGS. 1-5, concurrently, the wireless input device 100 comprises a housing 110 (FIG. 1), a wheel 120 (FIG. 1), a first sensor unit 140 (FIG. 4), a wireless communication unit 150 (FIG. 4), first and second buttons 132 and 134 (FIG. 1), and a power supply 170 (FIG. 5).

The housing 110 has the shape of a circular ring with a predetermined radius, (i.e., a toroidal shape) that includes a circumferential groove 112 (or openings) formed throughout an outer circumference thereof, and has a C-shaped cross section in a diametrical direction. The housing 110 is provided with front and rear recesses (or openings) for installing the first and second buttons 132 and 134 in the front and rear portions thereof. The first and second buttons 132 and 134 are arranged parallel to a central axis of the housing 110.

The wheel 120 has the shape of a circular ring with a predetermined radius, and is installed in the circumferential groove 112 of the housing 110 so as to be able to be rotated around the central axis of the housing through an angle of 360°. The wheel 120 is rotated by a force provided by the finger of a user. Part of the wheel 120 protrudes outwardly from the circumferential groove 112 for the purpose of easy manipulation by the user.

The first sensor unit 140 is installed inside the wheel 120, and is fixed to the wheel 120 so as to be able to rotate along with the wheel 120.

FIG. 4 illustrates a first sensor unit 140. As illustrated, the first sensor unit 140 has the shape of a circular ring with a predetermined radius, and includes first sections 142 and second sections 144 that are alternately disposed around the central axis of the housing. Each of the first sections 142 is made of a conductive material such as metal, while each of the second sections 144 is made of an insulating material such as plastic.

The first sensor unit 140 may be a conductor that is partly coated with an insulating material, or an insulator that is partly coated with a conductive material, or a combination of at least one insulating layer and at least one conductive layer that are stacked on an inner wall of the wheel 120.

The wireless communication unit 150 includes first and second transceivers 152 and 154, respectively, that are installed inside the housing 110 and send scroll signals, and a third transceiver that is installed inside the housing 110 and sends a selection signal. Each of the transceivers 152, 154, and 156 includes a grain-sized radio frequency identification (RFID) chip. The RFID chip includes an antenna for sending and receiving radio waves, and a controller for generating a signal. The RFID is divided into two types: an active type that requires a power supply such as a battery; and a passive type that does not require such a power supply.

Figure 6:
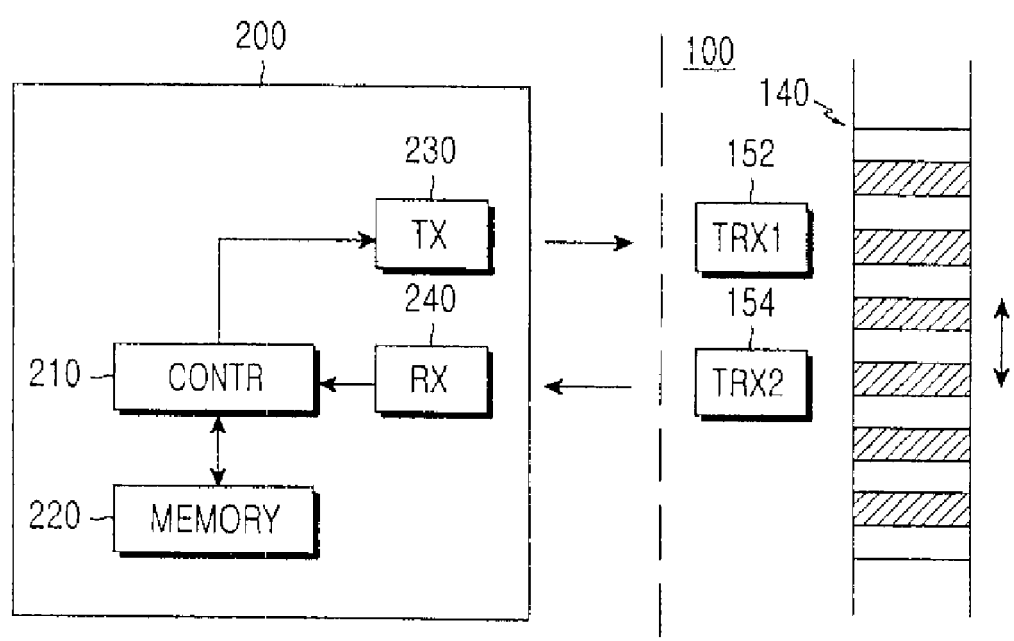
FIG. 6 illustrates a process in which a host device processes a scroll signal.

Referring to FIG. 4, the first and second transceivers 152 and 154 function as second sensor units, each of which corresponds to the first sensor unit 140, and include two respective pairs of contact members 153 and 155, respectively, each of which extends using a wire. The first contact members 153 of the first transceiver 152 are always in contact with the first sensor unit 140, and the second contact members 155 of the second transceiver 154 are always in contact with the first sensor unit 140 spaced apart from the first contact members 153 in a circumferential direction of the first sensor unit 140. At this time, the spaced distance between the contact members is set in a manner such that the first contact members 153 and the second contact members 155 can contact the same respective sections. The first and second contact members 153 and 155 function as switches, so that they are switched on when contacting the first section 142, and are switched off when contacting the second section 144. Each of the first and second transceivers 152 and 154 sends a scroll signal indicating the switched state of the corresponding contact member to a host device 200 (FIG. 6). In other words, each of the first and second transceivers 152 and 154 sends a scroll signal, which indicates an arranged state of the corresponding contact member 153 or 155 with regard to the first sensor unit 140 (or the first section 142 or the second section 144), or which indicates a position of the wheel 120 detected from this arranged state, to the host device 200 (FIG. 6).

Although this embodiment has been described with regard to the first and second contact members 153 and 155 always being in contact with the first sensor unit 140, the second sections 144 of the first sensor unit 140 may be sunken so as not to be in contact with the first and second contact members 153 and 155. In other words, the first sensor unit 140 may have a convex-concave shape. In this case, the lack of contact with the second section is comparable to the second section 144 being made of an insulating material.

FIG. 5 illustrates a circuit associated with first and second buttons. The first button 132 is operated (pushed or released) to switch on or off a first switch 160. The first switch 160 is connected between a power supply 170, such as a battery, and the third transceiver 156, and a first resistor R1 180 is connected with the first switch 160 and the third transceiver 156. The second button 134 is operated to switch on or off a second switch 165. The second switch 165 is connected between the power supply 170 and the third transceiver 156, and a second resistor R2 185 is connected between the second switch 165 and the third transceiver 156. The first and second resistors 180 and 185, respectively, have different values of resistance. Thus, the third transceiver 156 determines which one of the switches is switched on according to a level of input power. The third transceiver 156 sends a first selection signal (e.g. a "confirm" signal) to the host device 200 when the first switch 160 is switched on, and sends a second selection signal (e.g. a "cancel" signal) to the host device 200 when the second switch 165 is switched on.

FIG. 6 is a view illustrating a process in which a host device processes a scroll signal. The host device 200 includes a controller 210 having a memory 220, a sender 230 for sending a state request signal, and a receiver 240 for receiving scroll signals and a selection signal. The controller 210 outputs a state request signal to the sender 230, and then the sender 230 sends the state request signal wirelessly to the first and second transceivers 152 and 154. The first and second transceivers 152 and 154, which receive the state request signal, send scroll signals indicating switched states of the respective contact members 153 and 155 to the receiver 240 wirelessly, and then the receiver 240 outputs the scroll signals to the controller 210. Further, the third transceiver 156 sends a selection signal in response to operation of the first or second switch 160 or 165 to the receiver 240 wirelessly, and then the receiver 240 outputs the selection signal to the controller 210.

The scroll signals indicate scroll movement of a first direction or a second direction. For example, the first direction refers to a clockwise direction in which the user rotates the wheel 120, or a downward direction in which a text is scrolled on a computer screen. Further, the second direction refers to a counterclockwise direction in which the user rotates the wheel 120, or an upward direction in which a text is scrolled on a computer screen.

A switch-off state is defined as "0," the case in which the first contact member 153 is in a switch-on state is defined as "r1," and the case in which the second contact member 155 is in a switch-on state is defined as "r2." When the user rotates the wheel 120 in a clockwise direction, the state of the switch is sequentially changed, for instance, as follows: {0,0}→{r1,0}→{r1,r2}→{0,r2}→{0,0}. In contrast, when the user rotates the wheel 120 in a counterclockwise direction, the state of the switch is sequentially changed, for instance, as follows: {0,0}→{0,r2}→{r1,r2}→{r1,0}→{0,0}.

The memory 220 stores previous states of the switch or previous positions of the wheel 120, and a scroll table as in Table 1 below. The controller 210 refers to the scroll table stored in the memory 220, and then provides a scroll event corresponding to current states of the switch to a software driver that is active.

TABLE 1

| From | To | | | |
|---|---|---|---|---|
| | 0, 0 | r1, 0 | r1, r2 | 0, r2 |
| 0, 0 | o | cw | x | ccw |
| r1, 0 | ccw | o | cw | x |
| r1, r2 | x | ccw | o | cw |
| 0, r2 | cw | x | ccw | o |

In Table 1, the symbol "o" indicates no variation in scroll position, "x" indicates a scroll error, "ccw" indicates counterclockwise scroll movement, and "cw" indicates clockwise scroll movement. With respect to the "o" or "x" event, the active software driver does not call any handler. With respect to the "ccw" or "cw" event, for instance, the active software driver calls a handler for scrolling the text in an upward or downward direction.

As described above, the wireless input device according to the present invention can be used to input information about the user into any one of a radio terminal, a household electric appliance, and so on, and concrete applications thereof are as follows:

(1) To move a spaceship, a racing car, or a racing bike in a 3D game, a block in well-known games such as a Tetris game, or a snake in a Phython game.

(2) To select an item from a menu for a mobile phone or a television.

(3) To scroll text in a computer word program.

(4) To adjust a sound volume, screen brightness, etc. in a multimedia player, or to jump to a next item in a music or video play list.

(5) Rotation of an object, magnification of a document, and 3D space movement in a 3D desktop environment. This 3D desktop environment is predicted to expand to a mobile phone, a smart phone, etc. within several years.

(6) To adjust a sound volume in a car audio system or to select music from a music list. During driving of a motor vehicle, the action in which a driver finds and pushes a desired button is considerably dangerous. Thus, the wireless input device enables the driver to adjust the car audio system without averting his/her eyes from a road.

(7) To adjust temperature of an air conditioner, to set a time of a microwave oven, or to adjust brightness of interior lighting.

While the invention has been shown and described with reference to certain exemplary embodiments thereof, it will be understood by those skilled in the art that various changes in form and details may be made therein without departing from the spirit and scope of the invention as defined by the appended claims.

For example, the first sensor unit 140 and the second sensor units 153 and 155 have been described to constitute a switch structure. However, the second sensor units include light-emitting elements or light-receiving elements, and light reflected from the first section 142 of the first sensor unit 140 may be detected using the light-receiving elements, or light passing through the second section in which a hole is formed may be detected using the light-receiving elements.

The wireless input device having a scroll function according to the present invention has the following advantages.

First, the wireless input device has the shape of a ring that can be put on the finger of the user, and thus can be used without excessive movement, such as movement of a wrist, so that it removes repeated actions that cause carpal tunnel syndrome.

Second, the wireless input device is made up of a number of small-sized constituents, such as an RFID chip, the housing, the wheel, and the like, so that it can provide a simple configuration and easy portability.

Third, due to easy portability, the wireless input device can be applied to various electronic devices requiring a scroll function, for instance, a computer, a multimedia player, a mobile phone, a car audio system, an air conditioner, and so on.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A ring-shaped wireless input device, which sends information regarding a scrolling operation input by a user to a host device wirelessly, the wireless input device comprising:
   a housing having a ring shape;
   a wheel rotatably installed on the housing;
   a first sensor unit including first and second sections alternatively disposed along a circumference of the wheel and the first sensor unit being rotated along with the wheel; and
   a wireless communication unit, disposed in the housing, having a second sensor unit arranged with the first sensor unit, the communication unit sending a scroll signal to the host device indicating an arranged state of the first sensor unit with regard to the second sensor unit.

2. The ring-shaped wireless input device according to claim 1, wherein the first section has a conductive characteristic, the second section has an insulating characteristic, and the second sensor unit includes a pair of contact members that contact one of the first and second sections to be switched on or off.

3. The ring-shaped wireless input device according to claim 1, wherein the first section has a conductive characteristic, the second section has an insulating characteristic, and the wireless communication unit includes first and second transceivers, each of which has a pair of contact members that contact one of the first and second sections to be switched on or off.

4. The ring-shaped wireless input device according to claim 3, wherein each of the first and second transceivers includes a radio frequency identification chip.

5. The ring-shaped wireless input device according to claim 3, further comprising a button protruding from one of front and rear portions of the housing, wherein the wireless communication unit includes a third transceiver that sends a selection signal responding to operation of the button to the host device.

6. The ring-shaped wireless input device according to claim 5, further comprising:
   a switch corresponding to the button; and
   a power supply connected with the third transceiver through the switch.

7. A input device for providing an indication of a scroll operation, the input device comprising:
   a toroid housing having a circular outer periphery surface;
   a rotatable wheel assembly mounted to the outer peripheral surface of the housing;
   first and second sections alternatively disposed along an inner circumference of the wheel assembly, said first and second sections each being composed of a material having a physical property that can be sensed;
   a wireless communication unit having a sensor including first and second transceivers, each of said first transceiver and said second transceiver being in sensing contact with at least one of said first and second sections, wherein each of said first and second transceivers provide a signal with regard to sensing proximity with at least one of said first and second sections, said wireless communication unit being responsive to said provided signal for sending a scroll signal to a host device.

8. The input device of claim 7, further comprising:
at least one button protruding from at least one of front and rear portions of the housing; and
a third transceiver in contact with each of said at least one button, wherein the third transceiver sends a selection signal to said host device responsive to an operation of each of said at least one of button.

9. The input device of claim 7, wherein said scroll signal indicates a direction of rotation of said rotatable wheel.

10. The input device of claim 9, wherein said direction of rotation is determined by an order of contact with said first and second sections.

11. The input device of claim 7, wherein said first and second transceivers are RFID devices.

12. The input device of claim 8, wherein said third transceiver is an RFID device.

13. The input device of claim 8, wherein said selection signal is at least one of a confirm indication and a cancel indication.

14. The input device of claim 7, wherein said contact between said sensor and said least one of said first and second sections is selected from the group of:
electrically and optical.

15. The input device of claim 14, wherein said optical contact is performed using a light emitting device.

16. The input device of claim 7, wherein said first sections are composed of an conductive material and said second sections are composed of an insulating material.

17. The input device of claim 7, wherein said second sections are concave shaped to inhibit contact with said first and second transceivers.

* * * * *